(12) United States Patent
Qian et al.

(10) Patent No.: US 8,821,706 B2
(45) Date of Patent: Sep. 2, 2014

(54) METHOD AND APPARATUS FOR PRODUCING CONDUCTIVE POLYMER FILM

(75) Inventors: Pu Qian, Wako (JP); Kazuhiro Kagawa, Wako (JP); Masatoshi Osawa, Hokkaido (JP)

(73) Assignee: Hondo Motor Co., Ltd., Tokyo (JP)

( * ) Notice: Subject to any disclaimer, the term of this patent is extended or adjusted under 35 U.S.C. 154(b) by 416 days.

(21) Appl. No.: 13/234,846

(22) Filed: Sep. 16, 2011

(65) Prior Publication Data

US 2012/0085653 A1    Apr. 12, 2012

Related U.S. Application Data

(62) Division of application No. 11/809,125, filed on May 31, 2007, now abandoned.

(30) Foreign Application Priority Data

May 31, 2006   (JP) ................................. 2006-152387

(51) Int. Cl.
   *C25D 21/12*   (2006.01)
   *C25D 9/02*    (2006.01)

(52) U.S. Cl.
   USPC ............................................ 205/84; 205/317

(58) Field of Classification Search
   USPC .................................................. 205/84, 317
   See application file for complete search history.

(56) References Cited

U.S. PATENT DOCUMENTS 5,684,574 A  *  11/1997  Shiokawa et al. ............... 356/72
2004/0231993 A1 *  11/2004  Price ............................. 205/81

FOREIGN PATENT DOCUMENTS

WO    2004/081572 A1    9/2004

OTHER PUBLICATIONS

"Analysis of Formation Process of Conductive Polymer Film by Micro-Infrared ATR Method" by Akao et al., Resume of Lectures at the Tokyo Conference on Analysis Equipment and Systems, pp. 57-58 (1995).*

"FTIR ATR Spectroelectrochemical Investigations of Polyaniline with Perrhenate as a New Doping System" by Ping et al., Electrochimica Acta 41(5), pp. 767-772 (1996).*

Akao, et al., "Analysis of Formation Process of Conductive Polymer Film by Micro-Infrared ATR Method," Resume of Lectures at the Tokyo Conference on Analysis Equipment and Systems, pp. 57-58 (1995).

(Continued)

*Primary Examiner* — Bryan D. Ripa
(74) *Attorney, Agent, or Firm* — Nelson Mullins Riley & Scarborough LLP; Anthony A. Laurentano

(57) ABSTRACT

A method for producing a conductive polymer film using an apparatus comprising a prism having a working electrode, a light-emitting means, a light probe disposed on both sides of the prism, a container having an electrolytic solution containing a conductive-polymer-forming monomer and a dopant, a counter electrode immersed in the electrolytic solution, a power supply connected to a working electrode and the counter electrode, and a controller connected to the light probe and the power supply means. The method comprises determining an absorption spectrum from light reflected by the conductive polymer film, storing the relation between the absorbance of the conductive polymer film obtained from the absorption spectrum and a parameter of the conductive polymer film in the controller, and controlling current supply to the electrodes based on the relation of the absorbance and the parameter to obtain a desired parameter.

1 Claim, 10 Drawing Sheets

(56) References Cited

OTHER PUBLICATIONS

Fou, A.C. et al., "Molecular-Level Processing of Conjugated Polymers. 2. Layer-by-Layer Manipulation of In-Situ Polymerized p-Type Doped Conducting Polymers," Macromolecules, vol. 28:7115-7120 (1995).

Ping, Zhao et al., "FTIR ATR Spectroelectrochemical Investigations of Polyaniline with Perhenate as a New Doping System," Electrochimica Acta, vol. 41(5):767-772 (1996).

Ping, Zhao et al., "Protonation and electrochemical redox doping processes of polyaniline in aqueous solutions: Investigations using in situ FTIR-ATR spectroscopy and a new doping system," J. Chem. Soc., Faraday Trans., vol. 93 (1):121-129 (1997).

Rangamani, Anuradha G. et al., "Total internal reflectance IR spectroscopy of polypyrrole on a silicon electrode," Synthetic Metals, vol. 64:91-95 (1994).

Yakutin, V.I. et al., "Internal Reflection Spectroscopy. Applications in Chemistry and Industry," Russian Chemical Reviews, vol. 41(8):692-709 (1972).

Yaniger, Stuart I. et al., "Dynamic FT-IR. Part I: Rapid-Scan Methods in Spectroelectrochemistry," Applied Spectroscopy, vol. 40(2):174-180 (1986).

Zhao, C.L. et al., "FTIR-ATR spectroscopic determination of the distribution of surfactants in latex films," Colloid & Polymer Sci., vol. 265:823-829 (1987).

Zimmermann, Angela et al., "Initial states in the electropolymerization of aniline and p-aminodiphenylamine as studied by in situ FT-IR and UV-Vis spectroelectrochemistry," Synthetic Metals, vol. 93:17-25 (1998).

\* cited by examiner

METHOD AND APPARATUS FOR PRODUCING CONDUCTIVE POLYMER FILM

RELATED APPLICATIONS

This application is a divisional of U.S. application Ser. No. 11/809,125, filed May 31, 2007, which claims priority to Japanese Application Serial No. 2006-152387, filed May 31, 2006, the entire contents of which are incorporated herein by reference. The contents of any patents, patent applications, and references cited throughout this specification are hereby incorporated by reference in their entireties.

FIELD OF THE INVENTION

The present invention relates to a method for producing a conductive polymer film with desired properties using absorption spectra of its reflected light, and an apparatus for producing such a conductive polymer film.

BACKGROUND OF THE INVENTION

In a polymer actuator, the thickness and uniformity of a conductive polymer film are desirably controlled accurately, because they affect the response speed and displacement ratio of the actuator. A conductive polymer film is generally produced by an electrochemical polymerization method, which comprises immersing a working electrode and a counter electrode in a monomer solution, and supplying electric current between both electrodes. Although the thickness of the resultant conductive polymer film would be able to be accurately measured by an atomic force microscope if it were taken out of the solution, it would need lengthy steps.

To accurately control the thickness of a conductive polymer film, it is desirable to measure the change of the thickness with time while forming the film. Although the production of a conductive polymer film by a gas-phase reaction while irradiating infrared rays makes it possible to detect the change of thickness with time by a reflection-type infrared thickness meter, the production of a conductive polymer film by an electrochemical polymerization method does not make the measurement of the thickness using a reflection-type infrared thickness meter possible, because the solution hinders the measurement.

A conductive polymer film used for a polymer actuator, etc. is desirably uniform not only in a planar direction but also in a thickness direction, such that it can show stable performance. Even a largely extendable, conductive polymer film would not be useful for practical applications because of lack of reliability, if it were not uniform in a thickness direction. To make the electrochemically polymerized conductive film uniform in a thickness direction, it is desirable to have a constant film-forming speed. However, a constant-voltage or current method generally used in the electrochemical polymerization method fails to provide a constant film-forming speed. In the case of the constant-voltage method, electric resistance at an interface between the electrode surface and the solution changes as the film grows. Accordingly, even if a constant voltage were applied, the voltage actually applied to the film would not be constant, failing to achieve a constant film-forming speed. In the case of the constant-current method, the film surface roughness changes as the film grows, resulting in the change of current per a unit area, and thus the change of the film-forming speed. In any method, a constant film-forming speed cannot be achieved, failing to obtain a film uniform in the thickness direction.

Akao, et al., "Analysis of Formation of Conductive Polymer Film by Micro-Infrared ATR Method," pp. 57-58, 1995, Resume of Lectures at the Tokyo Conference on Analysis Equipment And Systems, describe a system of measuring a film formed by an electrochemical polymerization method with an attenuated total reflection (ATR) prism in a micro-infrared spectrometer as an electrode. An ATR prism made of germanium as a working electrode, and a gold electrode as a counter electrode are immersed in a pyrrole solution, and voltage is applied between both electrodes to form a polypyrrole film on the ATR prism surface. The absorption spectrum of infrared rays reflected by the film via the ATR prism has a peak assigned to polypyrrole. However, a method of forming a uniform film with a constant speed has not been known.

Conductive polymer films with optimum degrees of oxidation are desired in applications other than polymer actuators, because the degree of oxidation affects the conductivity of the conductive polymer films. However, no method of controlling the degree of oxidation of a conductive polymer film has been known. A G Rangamani, et al., "Synthetic Metals," Vol. 64, pp. 91-95, 1994 describe that with a silicon prism as a working electrode and a platinum electrode immersed in an electrolytic solution, a conductive polymer film is irradiated with infrared rays via the prism to examine its degree of oxidation. However, they have not controlled the degree of oxidation of the conductive polymer film during its formation on a real-time basis.

OBJECT OF THE INVENTION

Accordingly, an object of the present invention is to provide a method for producing a desired conductive polymer film by controlling the condition of changing the conductive polymer film, utilizing the correlation of changes occurring on the conductive polymer film and its absorption spectrum, and an apparatus used for such a method.

DISCLOSURE OF THE INVENTION

As a result of intense research in view of the above object, the inventors have found that a desired conductive polymer film can be obtained by monitoring an absorption spectrum reflecting changes occurring on the conductive polymer film to find the correlation of the absorption spectrum and the changes of the conductive polymer film, and controlling the conditions of changing the conductive polymer film based on that correlation. The present invention has been completed based on this finding.

Thus, the first method of the present invention for producing a conductive polymer film uses an apparatus comprising a prism having a working electrode formed on its one surface, a light-emitting means and a light probe disposed on both sides of the prism, a container attached to the prism in a liquid-tight manner with its open side facing the working electrode, an electrolytic solution containing a conductive-polymer-forming monomer and a dopant, which is contained in the container, a counter electrode immersed in the electrolytic solution, a power supply means connected to the working electrode and the counter electrode, and a controller connected to the light probe and the power supply means, and comprises the steps of (1) forming the conductive polymer film on the working electrode by supplying current from the power supply means to the working electrode and the counter electrode, while projecting light from the light-emitting means to the prism, (2) determining an absorption spectrum by the light probe from the light reflected by the conductive polymer film, which exits from the prism, (3) storing the relation between the absorbance of the conductive polymer film obtained from the absorption spectrum and a parameter of the conductive polymer film in the controller, and (4) controlling current supply to the working electrode and the counter electrode based on the relation of the absorbance and the parameter by the controller to obtain a desired parameter.

In the above method, the parameter is preferably the thickness of the conductive polymer film, and the relation is preferably expressed by a calibration curve of the thickness and absorbance of the conductive polymer film.

The method of the present invention for changing the oxidation/reduction state of a conductive polymer film uses an apparatus comprising a prism having the conductive polymer film formed on a working electrode provided on its one surface, a light-emitting means and a light probe disposed on both sides of the prism, a container attached to the prism in a liquid-tight manner with its open side facing the working electrode, an electrolytic solution containing a dopant, which is contained in the container, a counter electrode immersed in the electrolytic solution, a power supply means connected to the working electrode and the counter electrode, and a controller connected to the light probe and the power supply means, and comprises the steps of (1) changing the oxidation/reduction state of the conductive polymer film by supplying current from the power supply means to the working electrode and the counter electrode, while projecting light from the light-emitting means to the prism, (2) determining an absorption spectrum by the light probe from the light reflected by the conductive polymer film, which exits from the prism, (3) storing the relation between the absorbance of the conductive polymer film obtained from the absorption spectrum and the oxidation/reduction state of the conductive polymer film in the controller, and (4) controlling current supply to the working electrode and the counter electrode based on the relation of the absorbance and the oxidation/reduction state by the controller to obtain a desired oxidation/reduction state.

The second method of the present invention for producing a conductive polymer film uses an apparatus comprising a prism having a working electrode formed on its one surface, a light-emitting means and a light probe disposed on both sides of the prism, a container attached to the prism in a liquid-tight manner with its open side facing the working electrode, an electrolytic solution containing a conductive-polymer-forming monomer and a dopant, which is contained in the container, a counter electrode immersed in the electrolytic solution, a power supply means connected to the working electrode and the counter electrode, and a controller connected to the light probe and the power supply means, and comprises the steps of (1) forming the conductive polymer film on the working electrode by supplying current from the power supply means to the working electrode and the counter electrode, while projecting light from the light-emitting means to the prism, (2) determining an absorption spectrum by the light probe from the light reflected by the conductive polymer film, which exits from the prism, (3) determining the relation between the time period of forming the conductive polymer film and the thickness of the conductive polymer film, from the relation between the change of absorbance with time obtained from the absorption spectrum and the thickness of the conductive polymer film, at plural current levels, (4) determining the relation between current and the film-forming speed in a short time interval from the relation between the film-forming time and the thickness at each current level, and storing it in the controller, and (5) controlling the current based on said relation between current and the film-forming speed, such that the speed of forming the conductive polymer film is constant.

In any of the above methods, the prism is preferably made of at least one selected from the group consisting of silicon, germanium, zinc selenide, thallium bromoiodide, thallium bromochloride, quartz and glass. The working electrode is preferably a thin precious metal film. The interval of measuring the absorption spectrum is preferably 5 microseconds to 60 seconds. The conductive polymer is preferably polypyrrole.

The first apparatus of the present invention for producing a conductive polymer film comprises a prism having a working electrode formed on its one surface, a light-emitting means and a light probe disposed on both sides of the prism, a container attached to the prism in a liquid-tight manner with its open side facing the working electrode, an electrolytic solution containing a conductive-polymer-forming monomer and a dopant, which is contained in the container, a counter electrode immersed in the electrolytic solution, a power supply means connected to the working electrode and the counter electrode, and a controller connected to the light probe and the power supply means, (a) the power supply means supplying current to the working electrode and the counter electrode to form the conductive polymer film on the working electrode, while projecting light from the light-emitting means to the prism, (b) the light probe obtaining an absorption spectrum from the light reflected by the conductive polymer film, which exits from the prism, (c) the controller storing the relation between the absorbance of the conductive polymer film obtained from the absorption spectrum and a parameter of the conductive polymer film, and (d) the controller controlling current supply to the working electrode and the counter electrode based on the relation of the absorbance and the parameter to obtain a desired parameter.

The apparatus of the present invention for changing the oxidation/reduction state of a conductive polymer film comprises a prism having the conductive polymer film formed on a working electrode provided on its one surface, a light-emitting means and a light probe disposed on both sides of the prism, a container attached to the prism in a liquid-tight manner with its open side facing the working electrode, an electrolytic solution containing a dopant, which is contained in the container, a counter electrode immersed in the electrolytic solution, a power supply means connected to the working electrode and the counter electrode, and a controller connected to the light probe and the power supply means, (a) the power supply means supplying current to the working electrode and the counter electrode to form the conductive polymer film on the working electrode, while projecting light from the light-emitting means to the prism, (b) the light probe obtaining an absorption spectrum from the light reflected by the conductive polymer film, which exits from the prism, (c) the controller storing the relation between the absorbance of the conductive polymer film obtained from the absorption spectrum and the oxidation/reduction state of the conductive polymer film, and (d) the controller controlling current supply to the working electrode and the counter electrode based on the relation of the absorbance and the oxidation/reduction state to obtain a desired oxidation/reduction state.

The second apparatus of the present invention for producing a conductive polymer film comprises a prism having a working electrode formed on its one surface, a light-emitting means and a light probe disposed on both sides of the prism, a container attached to the prism in a liquid-tight manner with its open side facing the working electrode, an electrolytic solution containing a conductive-polymer-forming monomer and a dopant, which is contained in the container, a counter electrode immersed in the electrolytic solution, a power supply means connected to the working electrode and the counter electrode, and a controller connected to the light probe and the power supply means, (a) the power supply means supplying current to the working electrode and the counter electrode to form the conductive polymer film on the working electrode, while projecting light from the light-emitting means to the prism, (b) the light probe obtaining an absorption spectrum from the light reflected by the conductive polymer film, which exits from the prism, (c) the controller determining the relation between the time period of forming the conductive polymer film and the thickness of the conductive polymer film, from the relation between the change of absorbance with time obtained from the absorption spectrum and the thickness of the conductive polymer film, at plural current levels, (d) the controller determining the relation between current and the film-forming speed in a short time interval from the relation between the film-forming time and the thickness at each current level, and storing it, and (e) the controller controlling the current based on said relation between current and the film-forming speed, such that the speed of forming the conductive polymer film is constant.

DESCRIPTION OF THE PREFERRED EMBODIMENTS

Figure 1:
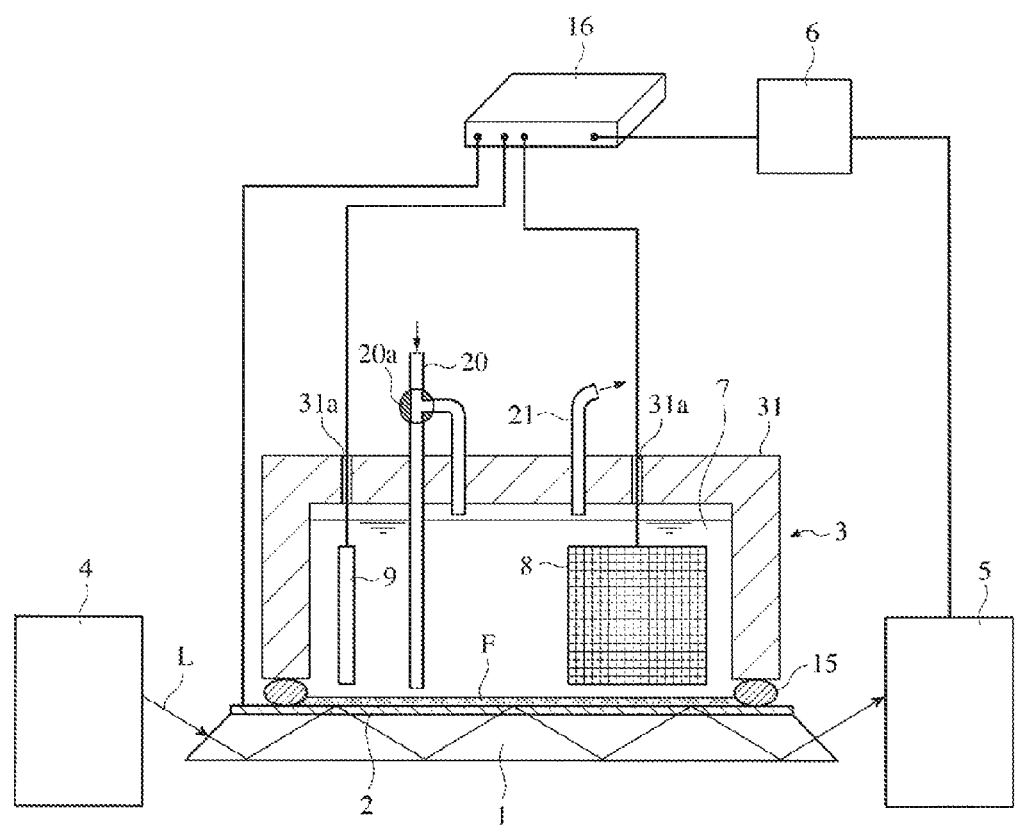
FIG. 1 is a cross-sectional view showing one example of the conductive-polymer-film-producing apparatuses of the present invention.

[1] First Production Method of Fiber-Reinforced Composite (A) Apparatus for Producing Conductive Polymer Film FIG. 1 shows one example of apparatuses used for the molecular-film-producing method of the present invention. This apparatus comprises a planar trapezoidal prism 1, a thin precious metal film 2 as a working electrode covering an upper surface of the planar trapezoidal prism 1, a container 3 disposed upside down on the thin precious metal film 2 on the prism 1 via a seal 15, a light-emitting means 4 disposed on one side of the prism 1, a light probe 5 disposed on the other side of the prism 1, and a power supply means 16 connected to the thin precious metal film 2, and a controller 6 connected to the light probe 5 and the power supply means 16.

The prism 1 permits light L projected from the light-emitting means 4 to pass. Because the thickness of the thin precious metal film 2 is smaller than the wavelength of the light L, the light L passes through the thin precious metal film 2. The thickness of the thin precious metal film 2 is preferably 1-100 nm, more preferably 5-50 nm, particularly 10-20 nm. The thin precious metal film 2 has good conductivity and corrosion resistance. The light L may be refracted in the prism 1 in an unrestricted number, for instance, once or in plural numbers as shown in FIG. 1.

The container 3 liquid-tight to the upper surface of the thin precious metal film 2 contains an electrolytic solution 7 comprising a monomer such as pyrrole, etc. and a dopant. Immersed in the electrolytic solution 7 are a net-shaped counter electrode 8, and a rod-shaped reference electrode 9. Lead wires connected to the counter electrode 8 and the reference electrode 9 are connected to the power supply means 16 through holes 31a provided in a bottom wall 31 of the container 3. The controller 6 controls current supply to the thin precious metal film 2 and the counter electrode 8. The controller 6 determines the timing of stopping current supply to the thin precious metal film 2 and the counter electrode 8, based on the absorbance obtained from absorption spectrum detected by the light probe 5.

A gas-supplying pipe 20 and a gas-discharging pipe 21 penetrate through the bottom wall 31 of the container 3, so that a gas in the container 3 is substituted by an inert gas such as nitrogen, argon, etc. before and/or during a polymerization reaction. The gas-supplying pipe 20 is branched to two, one open in the electrolytic solution 7, and the other open above the electrolytic solution 7. The gas-supplying pipe 20 has a three-way valve 20a at a branching point, such that an inert gas is supplied into or above the electrolytic solution 7.

The light-emitting means 4 projects the light L onto a slanting surface of the prism 1 at a predetermined angle. The wavelength of the light L is not particularly restricted as long as the light L is absorbed by the conductive polymer film F, but it is generally about 200-25000 nm, preferably within an infrared range. The light L is reflected by the conductive polymer film F, passes through the prism 1, and enters into the light probe 5, by which its absorption spectrum is measured. The shorter a time interval of measuring absorption spectrum, the more accurately the formation of the conductive polymer film can be controlled. The lower limit of the measuring time interval is practically 5 microseconds, though it is preferably 60 seconds or shorter.

(B) Calibration Curve

Figure 2:
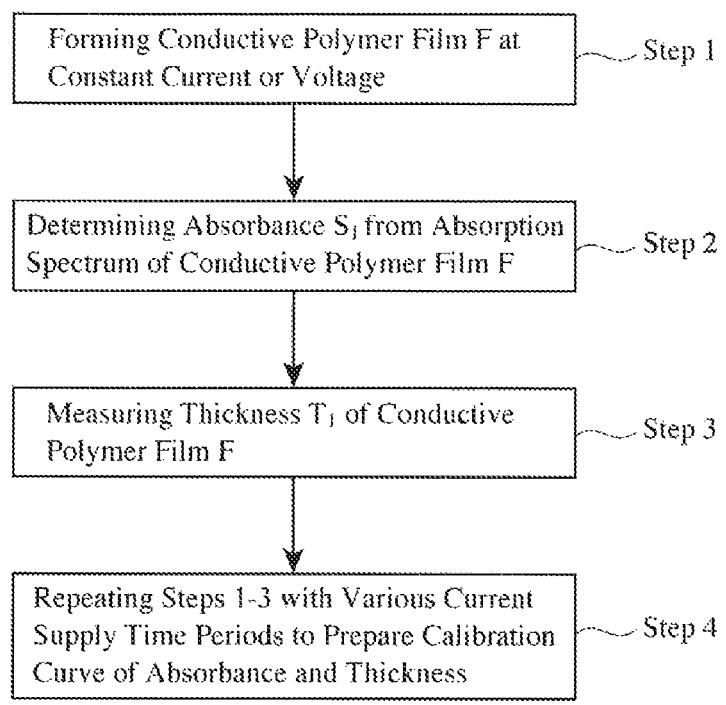
FIG. 2 is a view showing the steps of producing a calibration curve.
Figure 2:
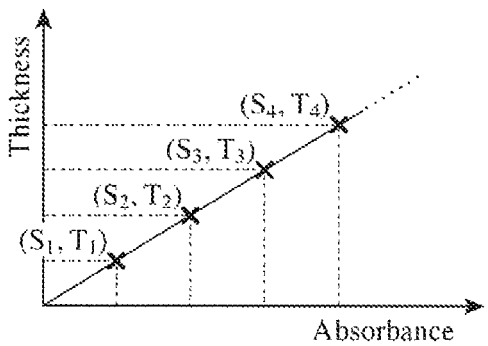

To stop current supply based on the absorbance, it is necessary to prepare a calibration curve showing the relation between the absorbance and the thickness of the conductive polymer film F. To prepare the calibration curve, as shown in FIG. 2, constant current or voltage is first supplied between the thin precious metal film 2 and the counter electrode 8 to polymerize the monomer in the electrolytic solution 7 while taking in the dopant, thereby forming a conductive polymer film F on the upper surface of the thin precious metal film 2 (step 1). The light L is then projected from the light-emitting means 4 to the prism 1, causing refraction at a lower surface of the prism 1 and reflection by the conductive polymer film F several times. The reflected light enters into the light probe 5, by which the absorption spectrum of the conductive polymer film F is measured to determine absorbance $S_1$ (step 2). The conductive polymer film F may be formed while projecting the light L to the prism 1, to determine the change of absorbance with time, though it is not indispensable to prepare the calibration curve.

The conductive polymer film F is taken out of the electrolytic solution 7 to measure the thickness $T_1$ of the conductive polymer film F by an atomic force microscope (step 3). The thickness $T_1$ of the conductive polymer film F indicating the absorbance $S_1$ can be determined by the steps 2 and 3. Repeating the steps 1-3 with various current supply time periods, the absorbance $S_2, S_3, S_4 \ldots$ and the corresponding thickness $T_2$, $T_3, T_4 \ldots$ are measured, to prepare a calibration curve of thickness and absorbance (step 4).

(C) Production of Conductive Polymer Film

To produce a conductive polymer film F having a desired thickness by the apparatus shown in FIG. 1 using the resultant calibration curve, the power supply means 16 supplies electric current between the thin precious metal film 2 and the counter electrode 8 while projecting the light L from the light-emitting means 4 to the prism 1, thereby forming the conductive polymer film F on the thin precious metal film 2. Because the light L reflected by the conductive polymer film F enters into the light probe 5, the light probe 5 can measure the absorption spectrum of the conductive polymer film F.

Figure 3A:
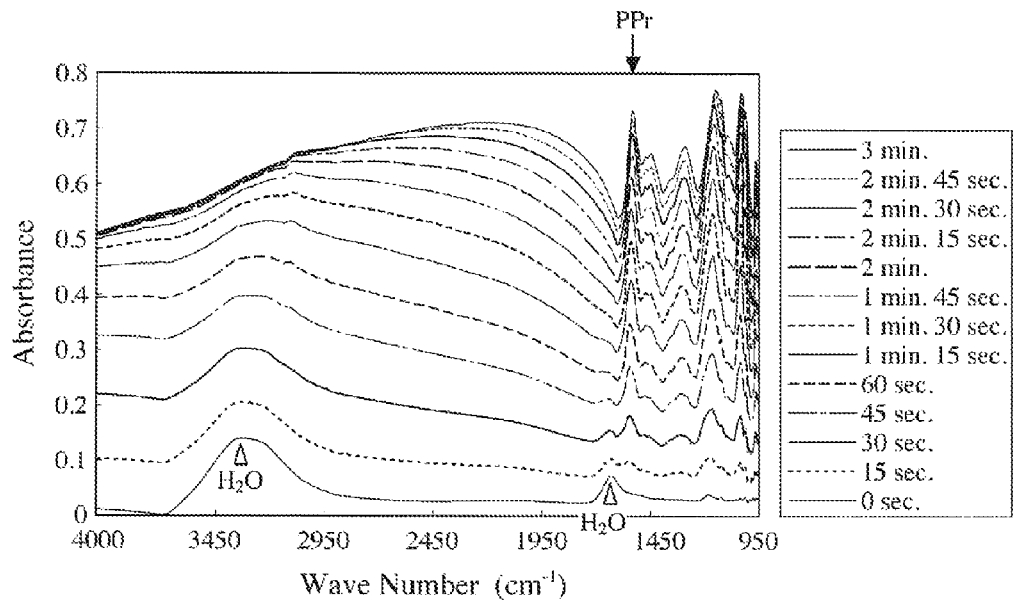
FIG. 3(a) is a graph showing the change of absorption spectra of a conductive polymer film with time in a wave number range of 950-4000 cm$^{-1}$.
Figure 3B:
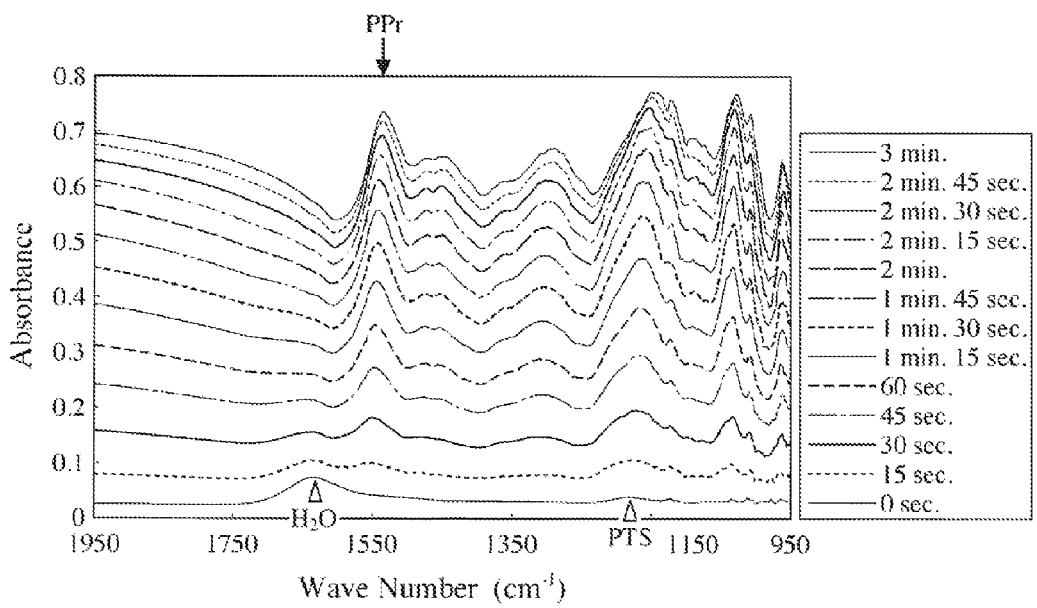
FIG. 3(b) a graph obtained by enlarging part of the graph of FIG. 3(a), showing the change of absorption spectra of a conductive polymer film with time in a wave number range of 950-1950 cm$^{-1}$.

FIG. 3 shows the absorption spectra of conductive polypyrrole films F produced by applying voltage of 0.8 V between the thin precious metal film 2 and the counter electrode 8, which were measured every 15 seconds until 3 minutes passed. The electrolytic solution 7 contains 0.3 mol/L of a pyrrole monomer, and 0.2 mol/L of p-toluene sulfonic acid as a dopant. FIG. 3(a) shows absorption spectra in a wave number range of 950-4000 $cm^{-1}$, and FIG. 3(b) shows part of the absorption spectra, which are in a wave number range of 950-1950 $cm^{-1}$. Peaks labeled "PPr" at 1550 $cm^{-1}$ in the graph are assigned to polypyrrole, and peaks labeled "PTS" are assigned to p-toluene sulfonic acid. As the polymerization of pyrrole proceeds, the peaks PPr increase, but when the polymerization time exceeds 3 minutes, the increment of peaks levels off. This appears to be due to the fact that a polypyrrole film becoming too thick blocks light transmission, making it difficult for the light L to progress in a thickness direction.

The controller 6 determines the thickness of the conductive polymer film F from the absorbance determined from the absorption spectrum detected by the light probe 5 using the calibration curve of thickness and absorbance, thereby determining the timing that the conductive polymer film F comes to have the predetermined thickness from the relation between the film-forming time and the absorbance, and stopping current supply at that timing. To control the thickness accurately, the light L should sufficiently reach an upper surface of the conductive polymer film F. The upper limit of the film thickness, until which the light L sufficiently reaches the upper surface of the conductive polymer film F, may vary depending on the types of the conductive polymer, but it is about 2 μm in the case of a polypyrrole film.

[2] Method for Changing Oxidation/Reduction State of Conductive Polymer Film

To change the oxidation/reduction state of the conductive polymer film F, using the same apparatus as in FIG. 1, a prism 1 having a thin precious metal film 2, on which a conductive polymer film F is formed, is immersed in an electrolytic solution 7 containing a dopant without a monomer. Current is supplied between the thin precious metal film 2 and the counter electrode 8 from the power supply means 16, while projecting a light L from a light-emitting means 4 to a slanting surface of the prism 1 at a predetermined angle. The conductive polymer film F is oxidized or reduced depending on the direction of current supply, resulting in the change of the absorption spectrum. Absorbance is determined from the absorption spectrum, and the oxidation/reduction potential of the conductive polymer film F is measured. The measurement of the absorbance and the oxidation/reduction potential at various current supply time periods provides a calibration curve of the absorbance and the oxidation/reduction potential. The controller 6 determines the absorbance at the desired oxidation/reduction potential from the calibration curve, thereby determining a necessary current supply time period from the relation between the absorbance and the current supply time. By current supply during that time period, a conductive polymer film F having a desired oxidation/reduction potential can be obtained. Because the conductive polymer film F ideally changes between an oxidized state and a reduced state reversibly, the timing of stopping current supply can be determined referring to the change of absorbance with time, thereby providing the conductive polymer film F with the most oxidized state, a neutral state or the most reduced state.

[3] Second Production Method of Conductive Polymer Film

Figure 4:
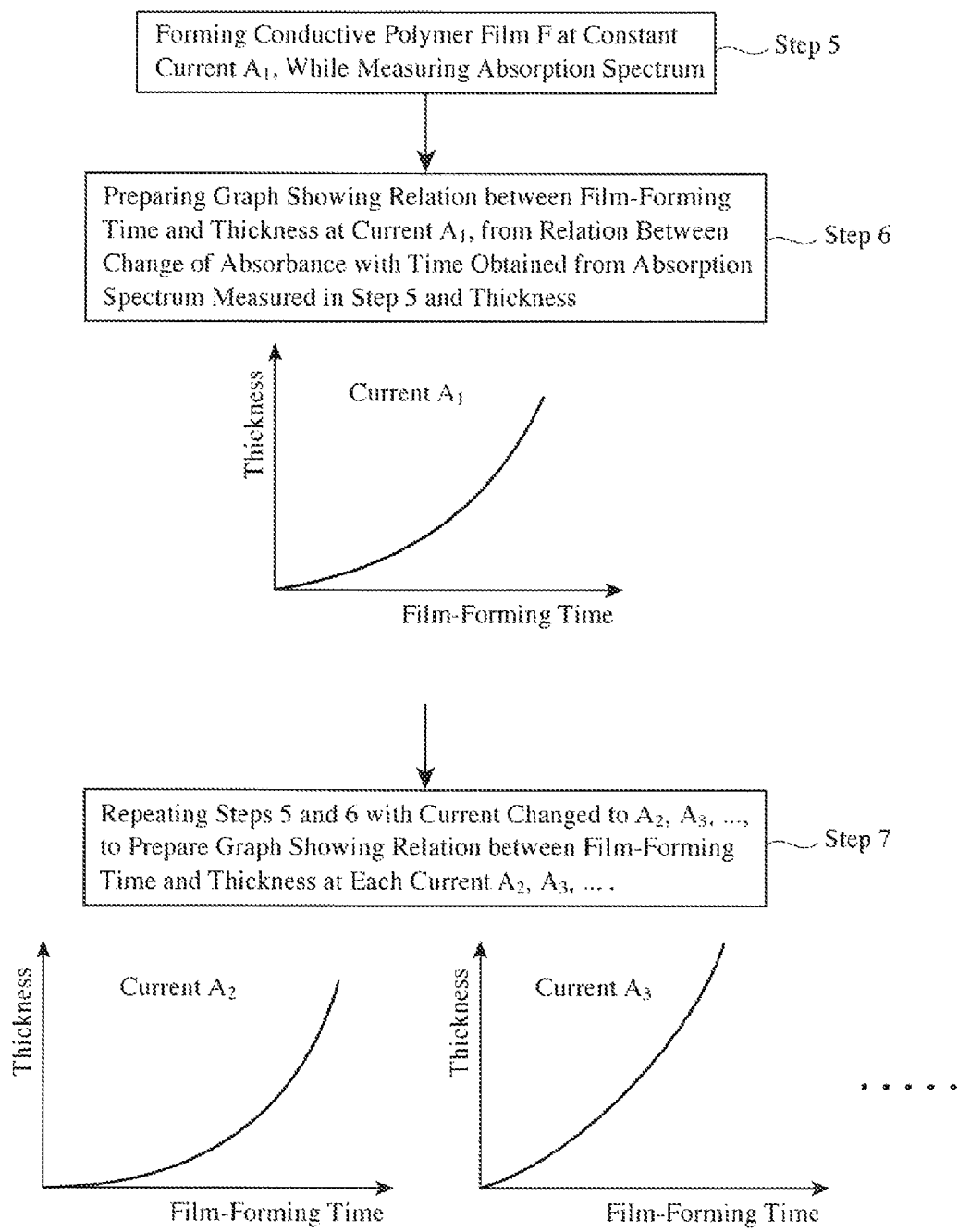
FIG. 4 is a view showing the steps of determining the relation between the film-forming time and the thickness of a conductive polymer film.
Figure 5:
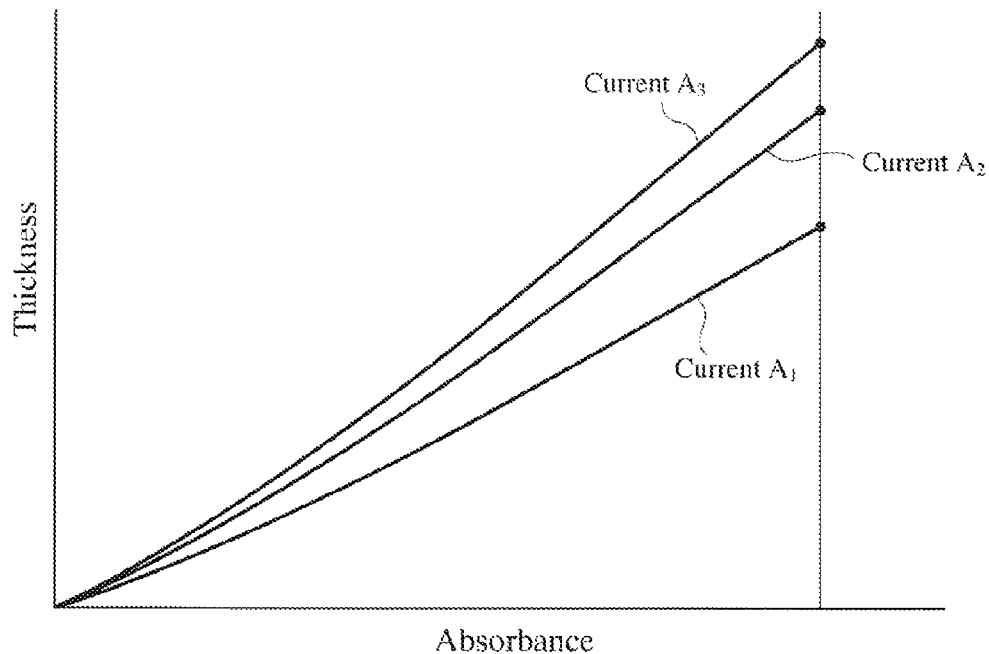
FIG. 5 is a graph schematically showing the relation between the absorbance and the thickness of the conductive polymer film at each current.
Figure 6:
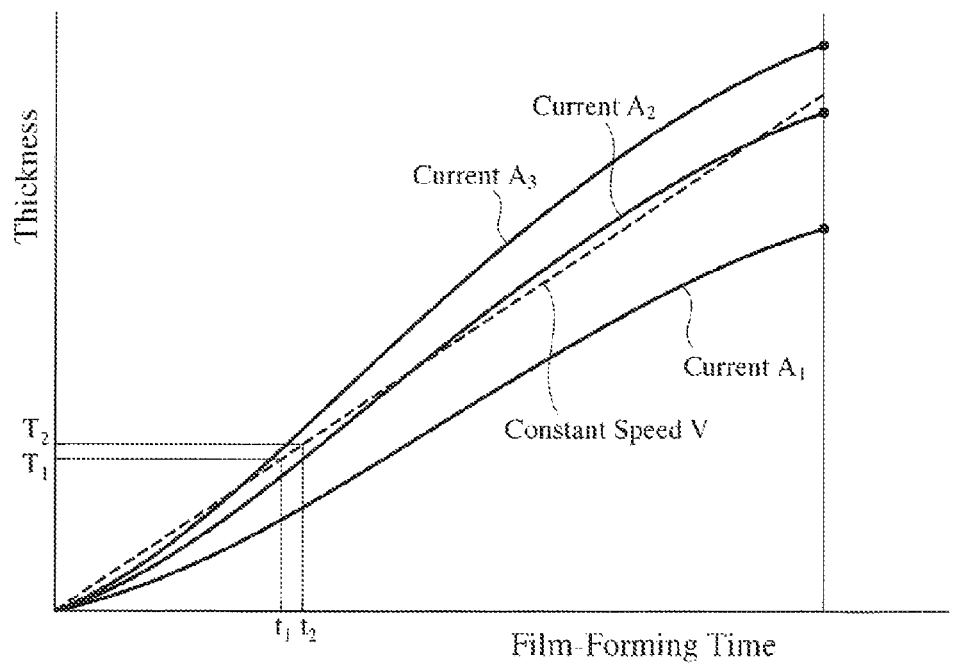
FIG. 6 is a graph schematically showing the relation between the film-forming time and thickness of the conductive polymer film at each current.

Referring to FIG. 4, a method for producing a conductive polymer film F on a thin precious metal film 2 at a constant speed will be explained. Using the apparatus shown in FIG. 1, constant current $A_1$ is supplied between the thin precious metal film 2 and the counter electrode 8 to form a conductive polymer film F, while measuring the absorption spectrum (absorbance) of the light reflected by the conductive polymer film F (step 5). The thickness of the conductive polymer film F at each absorbance is measured by an atomic force microscope to determine the relation between absorbance and thickness at current $A_1$. Further, the relation between the film-forming time and thickness at current $A_1$ is determined from the change of absorbance with time and the thickness at each absorbance (step 6). Repeating the steps 5 and 6 at plural current levels $A_2, A_3 \ldots$, the relation between the absorbance and the thickness, and the relation between the film-forming time and the thickness are determined at respective current levels (step 7). For simplicity, FIG. 5 shows the relation between the absorbance and the thickness at current $A_1, A_2$, $A_3$, and FIG. 6 shows the relation between the film-forming time and the thickness at current $A_1, A_2, A_3$. As is clear from FIG. 6, the thickness changes in an S-shaped manner relative to the film-forming time.

Figure 7:
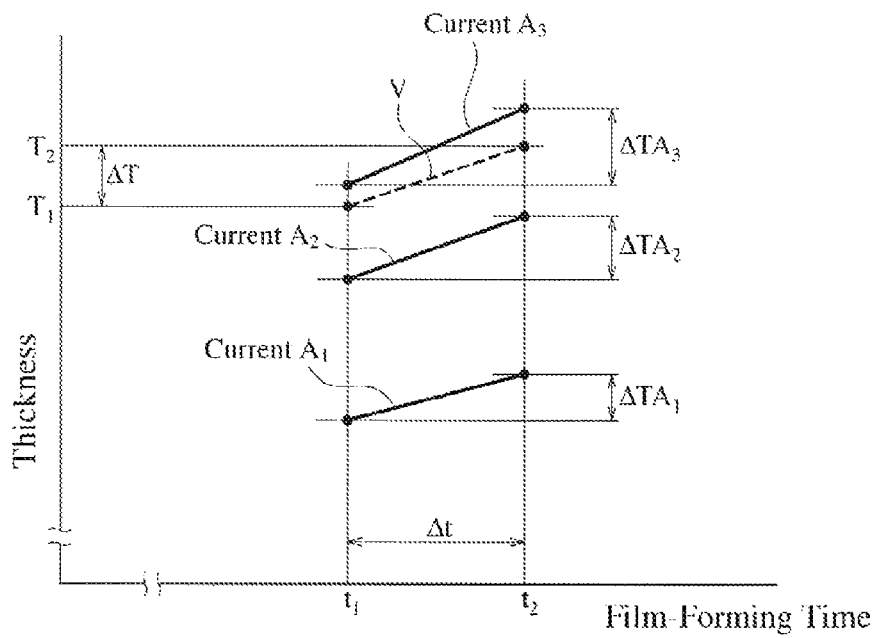
FIG. 7 is a graph showing an enlarged part of FIG. 6.
Figure 8:
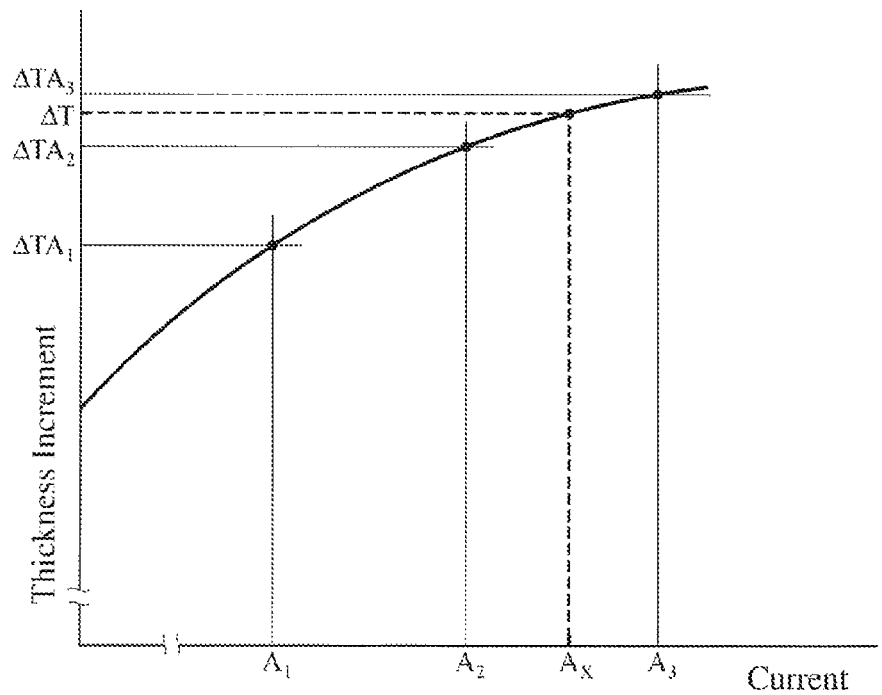
FIG. 8 is a graph schematically showing the relation between current and the thickness increment of the conductive polymer film.

It is assumed that a conductive polymer film F is produced at a constant speed, for instance, shown by a dotted line V in FIG. 6. As shown in FIG. 7 in an enlarged manner, when a short time period Δt passes from the time $t_1$ to the time $t_2$, the conductive polymer film F becomes thicker by ΔT from $T_1$ to $T_2$. In the same interval Δt, the thickness increment of the conductive polymer film F is $\Delta T_{A1}, \Delta T_{A2}, \Delta T_{A3}$ at constant current $A_1, A_2, A_3$, respectively. The relation between current and the thickness increment of the conductive polymer film F is depicted in FIG. 8. As the current changes from $A_1$ to $A_2$ to $A_3$, the thickness increment of the conductive polymer film F changes from $\Delta T_{A1}$ to $\Delta T_{A2}$ to $\Delta T_{A3}$ in a non-linear manner. Accordingly, with the thickness increment programmed as a function of current, current $A_X$ necessary for obtaining the thickness increment $\Delta T$ in the interval $\Delta t$ can be calculated. Even if current is assumed as constant in the interval $\Delta t$, the above calculation in the entire film-forming time period can determine current changing with time to obtain a substantially constant film-forming speed, because the interval $\Delta t$ is extremely short. Incidentally, voltage may be controlled instead of current.

[4] Various Examples of Apparatuses for Producing Conductive Polymer Film

Figure 9:
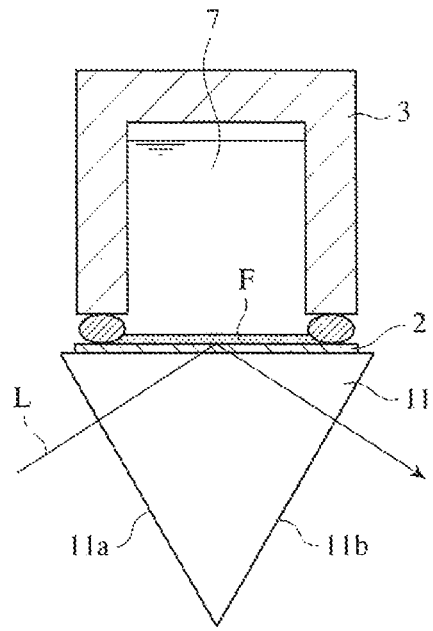
FIG. 9 is a cross-sectional view showing another example of a prism to which a container is attached.
Figure 10:
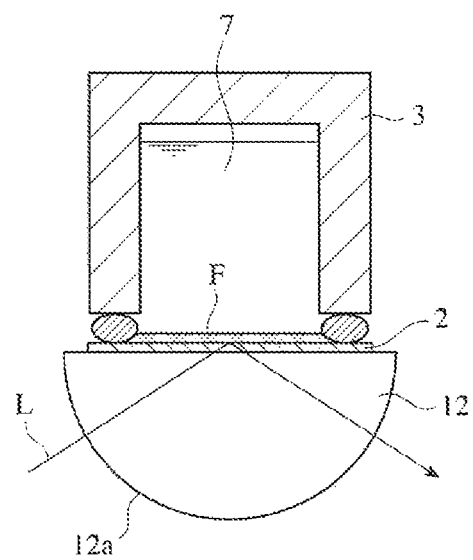
FIG. 10 is a cross-sectional view showing a further example of a prism to which a container is attached.

The prism 1 in the conductive-polymer-film-producing apparatus is not restricted to a trapezoidal prism shown in FIG. 1. FIG. 9 shows a triangular prism 11. A light L enters into the triangular prism 11 through a first slanting surface 11a, reflected by the conductive polymer film F, and exits from a second slanting surface 11b. FIG. 10 shows a semicircular prism 12. A light L enters into the prism 12 through a curved surface 12a at a point, reflected by the conductive polymer film F, and exits from the other point on a curved surface 12a.

Preferred examples of materials forming the prism include silicon, germanium, zinc selenide, thallium bromoiodide, thallium bromochloride, quartz and glass. Preferred examples of materials forming the thin precious metal film include gold and platinum.

FIG. 11 shows another example of the conductive-polymer-film-producing apparatus. Because this apparatus is the same as shown in FIG. 1, except that the former has a thin plate 101 having a thin precious metal film 2, on which a conductive polymer film F is formed, and pluralities of semicircular prisms 12 attached to a lower surface of the thin plate 101, only differences will be explained. For simplicity of depiction, the light-emitting means 4, the light probe 5, the controller 6, the power supply means 16, the gas-supplying pipe 20 and the gas-discharging pipe 21 are omitted. The thin plate 101 has the same refractive index as that of the circular prism 12. The thin precious metal film 2 is preferably as thick as in the example shown in FIG. 1.

Figure 11A:
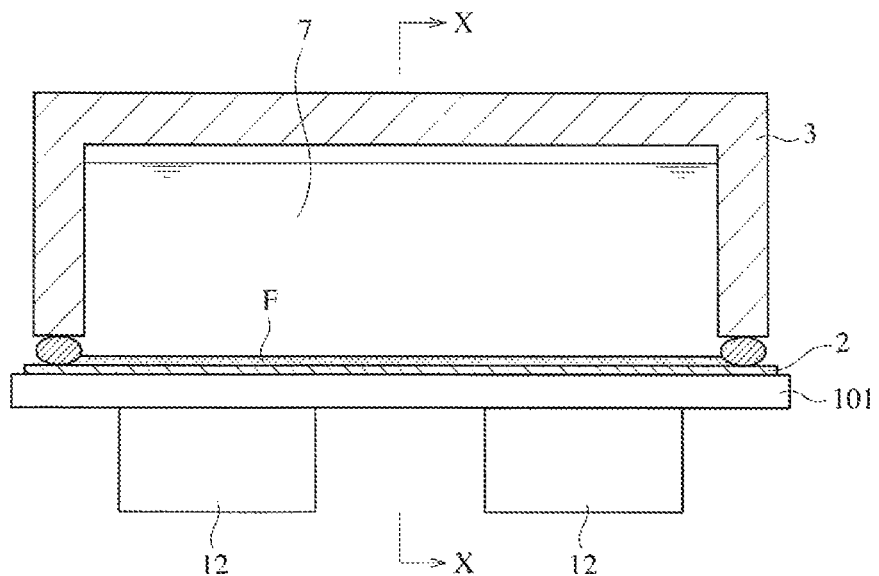
FIG. 11(a) is a vertical cross-sectional view showing another example of the conductive-polymer-film-producing apparatuses.
Figure 11B:
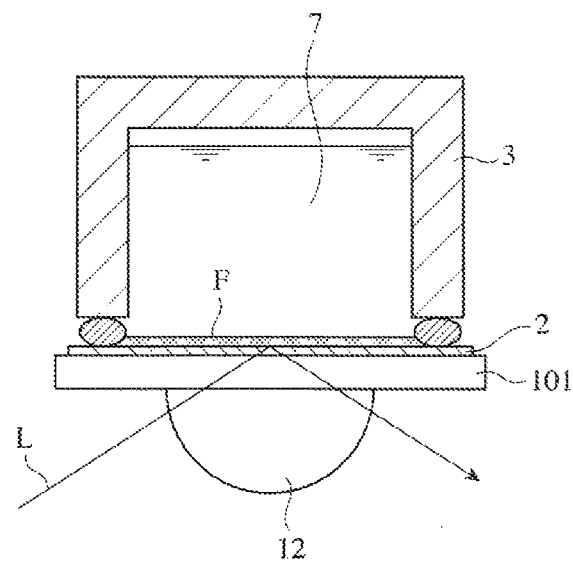
FIG. 11(b) is a cross-sectional view taken along the line X-X in FIG. 11(a).

In the example shown in FIGS. 11(a) and 11(b), two semicircular prisms 12, 12 are coaxially attached to the thin plate 101, but the prisms 12 are not restrictive in shape, number and arrangement. The number of the prisms 12 may be one, or 3 or more, and they may be arranged in parallel. The diameter of the prism 12 is generally 10-200 mm, preferably 10-50 mm. With the apparatus shown in FIG. 11, a conductive polymer film F can be produced while measuring its absorption spectrum at plural points.

Although the method for stopping or adjusting current or voltage supplied between the thin precious metal film 2 as a working electrode and the counter electrode 8 to control the thickness or oxidation/reduction state of the conductive polymer film F has been explained above, control by the controller 6 is not restricted thereto. With pipes for supplying a monomer and a dopant disposed in the container 3, the supply of the monomer and/or the dopant may be controlled to change the concentration of the monomer and/or the dopant. When the temperature of the electrolytic solution 7 is changed by the controller 6, a reaction speed of the monomer with the dopant can be changed.

What is controlled by the present invention is not limited to the thickness, film-forming speed and oxidation/reduction state of the conductive polymer film F, but may be a molecule-assembling structure (for instance, the bonding state of the conductive polymer to the dopant), etc. The control of the bonding state of the conductive polymer to the dopant may be carried out by producing a calibration curve from the peak height of the absorption spectrum representing the bonding state and the bonding state measured by X-ray photoelectron spectroscopy (XPS), and controlling current or voltage based on the measured peak height referring to the calibration curve.

When a monomer and a dopant are dropped into a solvent to form a conductive polymer film, the thickness of the conductive polymer film is determined from the absorbance determined from the absorption spectrum, using the calibration curve of absorbance and thickness, and the thickness is monitored. The dropping speeds of the monomer and the dopant are controlled, for instance, such that the thickness-increasing speed (film-forming speed) is constant.

The present invention will be explained in more detail referring to Examples below without intentions of restricting the present invention thereto.

EXAMPLE 1

(a) Production of Calibration Curve

Using the same apparatus as that shown in FIG. 1 except for having a semicircular prism, a conductive polymer film F was formed on a thin precious metal film 2 on a prism 1, to measure its absorption spectrum. The synthesis conditions of the conductive polymer, and the absorption-spectrum-measuring conditions are given below.

Electrolytic solution: 0.3 mol/L of pyrrole monomer,
  0.2 mol/L of p-toluene sulfonic acid sodium,
  Water as a solvent,
  Volume; 20 mL.
Prism: Semicircular silicon crystal prism of 25 mm in diameter and 25 mm in length.
Working electrode 20-nm-thick gold.
Counter electrode: Platinum plate of 20 mm×40 mm×0.5 mm.
Reference electrode: Silver/silver chloride electrode of 4.6 mm in diameter and 11.5 mm in length.
Infrared spectrometer: "SpectrumOne" available from PerkinElmer.
Current: 0.1 A.

Figure 12:
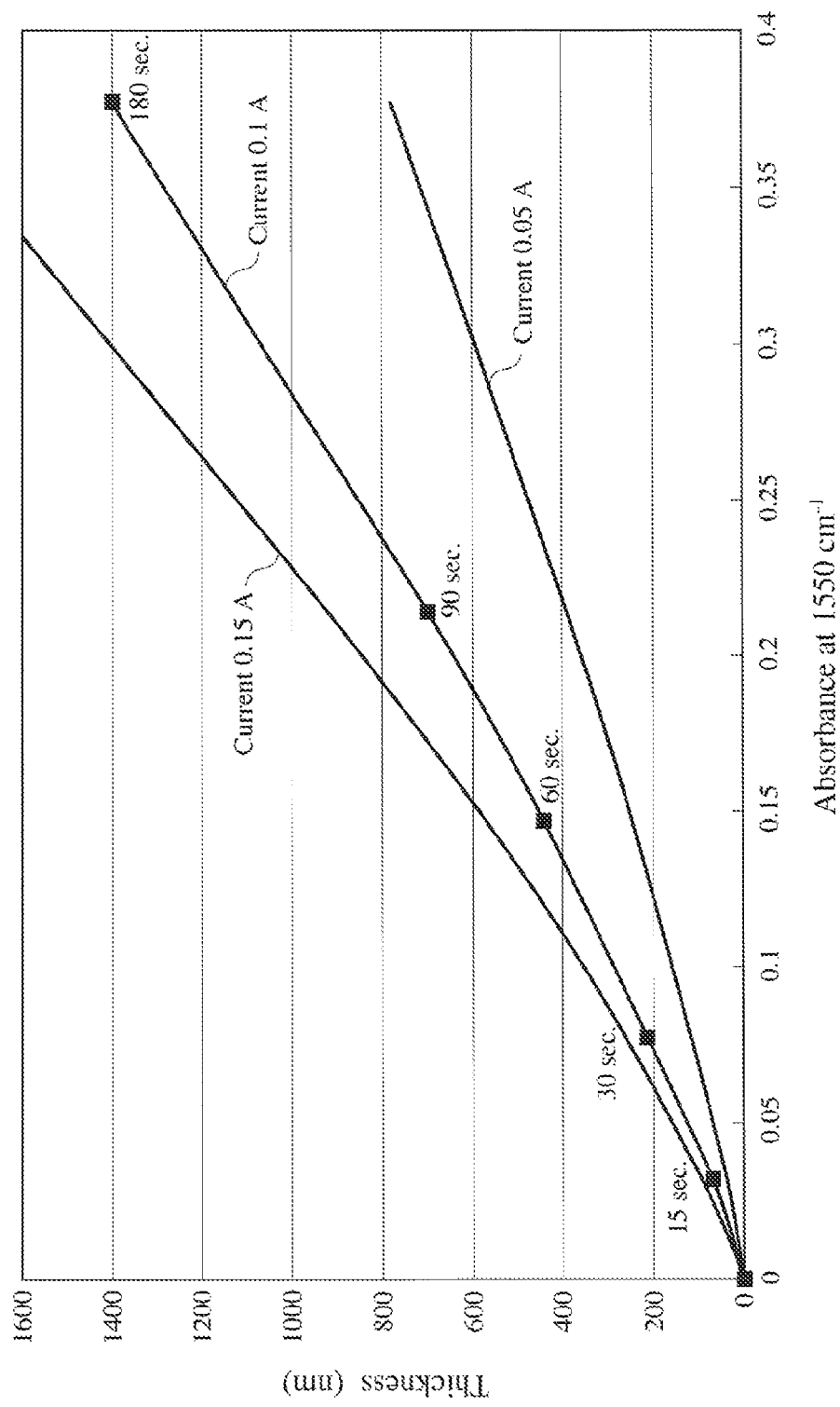
FIG. 12 is a graph showing the relation between the film-forming time and absorbance of a conductive polymer film produced at each current in Example 1.

With the thin gold film 2 as an anode and the platinum plate as a cathode, constant current of 0.1 A was supplied for 15 seconds to form a polypyrrole film F on the prism 1, and taken out of the electrolytic solution 7. The thickness of the polypyrrole film F was measured by an atomic force microscope ("JSPM-4200" available from JEOL Ltd.). Also, with respect to polypyrrole films F formed under the same conditions as above except for changing the current supply time to 30 seconds, 60 seconds, 90 seconds and 180 seconds, respectively, their thickness was measured. A calibration curve was produced from the measured absorption spectrum and thickness. The calibration curve is shown in FIG. 12. It is clear from FIG. 12 that the resultant calibration curve was a curve with a gradually increasing increment (inclination) until it passed about 90 seconds, indicating that the speed of forming a polypyrrole film F increased as the film-forming time. The relation between the film-forming time and the thickness at 0.1 A was able to be determined from FIG. 12.

(b) Preparation of Graph of Film-Forming Time and Thickness

While measuring the absorption spectrum, the polypyrrole film F was formed at a constant current of 0.05 A and 0.15 A, respectively. The conditions of producing the polypyrrole film F and measuring the absorption spectrum were the same as in the step (a). The relations between the absorbance and the thickness at 0.05 A and 0.15 A are also shown in FIG. 12. The relation between the film-forming time and the thickness at 0.05 A, 0.1 A and 0.15 A are as shown in FIG. 6.

(c) Production of Polypyrrole Film F

Figure 13:
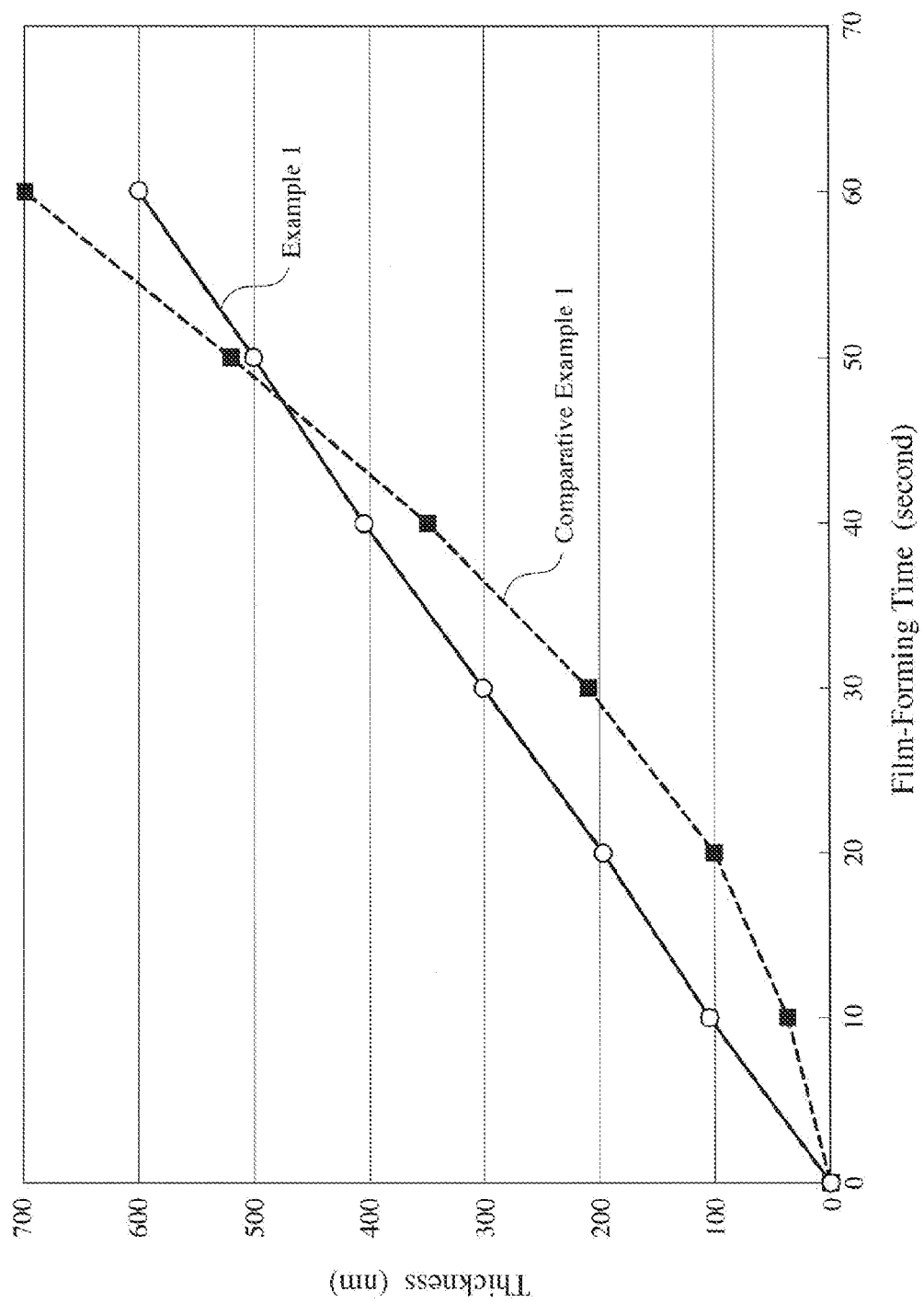
FIG. 13 is a graph showing the relation between the time period of forming polypyrrole films and their thickness in Example 1 and Comparative Example 1.

Based on the relation between the film-forming time and the thickness at each current, which was obtained in the step (b), the relation between current and the thickness increment as shown in FIG. 8 was determined. Based on the relation between current and the thickness increment, current was controlled by the controller 6, such that the film-forming speed was constant at 10 nm/s. A polypyrrole film F was formed on the thin gold film 2 at current controlled under the same conditions as in the step (a). The thickness of the polypyrrole film at the film-forming time of 10 seconds, 20 seconds, 30 seconds, . . . 60 seconds was measured by an atomic force microscope. The relation between the film-forming time and thickness of the polypyrrole film F is shown in FIG. 13. As is clear from FIG. 13, a substantially constant film-forming speed was obtained by controlling current. The polypyrrole film F obtained with the film-forming time of 60 seconds was as thick as 600 nm.

COMPARATIVE EXAMPLE 1

A polypyrrole film F was produced in the same manner as in the step (c) in Example 1 except for applying constant voltage of 0.8 V between the thin gold film 2 and the counter electrode 8. The film-forming time and the thickness are shown in FIG. 13. As is clear from FIG. 13, the film-forming speed was not constant. The polypyrrole film obtained with the film-forming time of 60 seconds was as thick as 700 nm.

EFFECT OF THE INVENTION

Because changes occurring on the conductive polymer film can be controlled on a real-time basis by the present invention, conductive polymer films with desired properties can be obtained.

What is claimed is:

1. A method for producing a conductive polymer film at a constant film-forming speed, using an apparatus comprising a prism having a working electrode formed on its one surface, a light-emitting means and a light probe disposed on both sides of said prism, a container attached to said prism in a liquid-tight manner with its open side facing said working electrode, an electrolytic solution containing a conductive-polymer-forming monomer and a dopant, which is contained in said container, a counter electrode immersed in said electrolytic solution, a power supply means connected to said working electrode and said counter electrode, and a controller connected to said light probe and said power supply means, the method comprising (1) forming said conductive polymer film on said working electrode by supplying current from said power supply means to said working electrode and said counter electrode, while projecting light from said light-emitting means to said prism, (2) determining an absorption spectrum by said light probe from the light reflected by said conductive polymer film, which exits from said prism, (3) determining the relation between the time period of forming said conductive polymer film and the thickness of said conductive polymer film from the relation between the change of absorbance with time obtained from said absorption spectrum and the thickness of said conductive polymer film, at plural current levels, (4) determining the relation between current and the film-forming speed in a short time interval from the relation between the time period of forming said conductive polymer film and the thickness of said conductive polymer film at each current level, and storing it in said controller, and (5) controlling the current based on said relation of current and the film-forming speed, such that the speed of forming said conductive polymer film is constant.

* * * * *